US012656716B2

(12) United States Patent　　(10) Patent No.:　US 12,656,716 B2
Tada et al.　　　　　　　　　　　(45) Date of Patent:　Jun. 16, 2026

(54) IMAGE FORMING APPARATUS

(71) Applicants:Ryoma Tada, Kanagawa (JP); Yuuta Hayashi, Kanagawa (JP); Kizuku Ohno, Kanagawa (JP); Yuusuke Yamamoto, Kanagawa (JP)

(72) Inventors: Ryoma Tada, Kanagawa (JP); Yuuta Hayashi, Kanagawa (JP); Kizuku Ohno, Kanagawa (JP); Yuusuke Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/886,107

(22) Filed: Sep. 16, 2024

(65) Prior Publication Data

US 2025/0164915 A1　　May 22, 2025

(30) Foreign Application Priority Data

Nov. 22, 2023　(JP) ................................. 2023-198295

(51) Int. Cl.
*G03G 15/00*　　　(2006.01)
*B32B 37/00*　　　(2006.01)
*B32B 37/06*　　　(2006.01)
*B32B 37/18*　　　(2006.01)
*G03G 15/20*　　　(2006.01)

(52) U.S. Cl.
CPC ............. *G03G 15/55* (2013.01); *B32B 37/06* (2013.01); *B32B 37/18* (2013.01); *G03G 15/2039* (2013.01); *G03G 15/205* (2013.01); *G03G 15/5016* (2013.01); *B32B 2037/0069*

(2013.01); *G03G 2215/00822* (2013.01); *G03G 2215/00919* (2013.01)

(58) Field of Classification Search
CPC ............. G03G 15/2039; G03G 15/205; G03G 15/6582; G03G 15/6588; G03G 2215/00426; G03G 2215/00789–00881; B32B 37/06; B32B 37/0069; B32B 38/0036; B32B 38/004
See application file for complete search history.

(56) References Cited

U.S. PATENT DOCUMENTS

| | | | | |
|---|---|---|---|---|
| 5,217,561 | A * | 6/1993 | Ueda ................... | B32B 38/0036 219/508 |
| 2005/0271408 | A1* | 12/2005 | Hayashi ............. | G03G 15/2021 399/70 |
| 2006/0251440 | A1* | 11/2006 | Tatematsu ........... | G03G 15/205 399/69 |

(Continued)

FOREIGN PATENT DOCUMENTS

| | | |
|---|---|---|
| JP | H9-164593 A | 6/1997 |
| JP | 2010-175937 A | 8/2010 |

*Primary Examiner* — Carla J Therrien
(74) *Attorney, Agent, or Firm* — Harness, Dickey & Pierce, P.L.C.

(57)　　　　　　ABSTRACT

An image forming apparatus includes a first heater, a second heater, and processing circuitry. The first heater is used in an image forming process. The second heater is used in a processing process after the image forming process. The processing circuitry is to measure a temperature of the first heater, measure a temperature of the second heater, and control start of the image forming process based on a first measured temperature of the first heater and a second measured temperature of the second heater.

15 Claims, 14 Drawing Sheets

(56) References Cited

U.S. PATENT DOCUMENTS

| | | | |
|---|---|---|---|
| 2009/0317102 A1* | 12/2009 | Hasegawa | G03G 15/2039 |
| | | | 399/45 |
| 2011/0078422 A1* | 3/2011 | Suzuki | G06F 1/3215 |
| | | | 712/E9.035 |
| 2020/0338877 A1* | 10/2020 | Takahashi | B65H 3/66 |
| 2021/0347589 A1* | 11/2021 | Suzuki | B65H 5/305 |
| 2022/0380166 A1* | 12/2022 | Nozaki | B65H 5/302 |
| 2024/0345521 A1* | 10/2024 | Hayashi | G03G 15/205 |

* cited by examiner

FIG. 4A-1

| TEMPERATURE OF HEATER (°C) | IMAGE FORMING PROCESSING TIME (SECOND) |
|---|---|
| $T_1$-$T_2$ | $t_{P1}$ |
| $T_2$-$T_3$ | $t_{P2}$ |
| $T_3$-$T_4$ | $t_{P3}$ |
| $T_4$-$T_5$ | $t_{P4}$ |
| ... | ... |

FIG. 4A-2

| TEMPERATURE OF HEATER (°C) | LAMINATION PREPARATION TIME (SECOND) |
|---|---|
| $T_1$-$T_2$ | $t_{L1}$ |
| $T_2$-$T_3$ | $t_{L2}$ |
| $T_3$-$T_4$ | $t_{L3}$ |
| $T_4$-$T_5$ | $t_{L4}$ |
| ... | ... |

FIG. 4B-1

| TEMPERATURE DIFFERENCE INSIDE DEVICE (°C) | CORRECTION VALUE OF IMAGE FORMING PROCESSING TIME (SECOND) |
|---|---|
| $T_1'$-$T_2'$ | $+t_{P1}'$ |
| $T_2'$-$T_3'$ | $+t_{P2}'$ |
| $T_3'$-$T_4'$ | $+t_{P3}'$ |
| $T_4'$-$T_5'$ | $+t_{P4}'$ |
| ... | ... |

FIG. 4B-2

| TEMPERATURE DIFFERENCE INSIDE DEVICE (°C) | CORRECTION VALUE OF LAMINATION PREPARATION TIME (SECOND) |
|---|---|
| $T_1'$-$T_2'$ | $+t_{L1}'$ |
| $T_2'$-$T_3'$ | $+t_{L2}'$ |
| $T_3'$-$T_4'$ | $+t_{L3}'$ |
| $T_4'$-$T_5'$ | $+t_{L4}'$ |
| ... | ... |

FIG. 4C-1

| TEMPERATURE DIFFERENCE OUTSIDE DEVICE (°C) | CORRECTION VALUE OF IMAGE FORMING PROCESSING TIME (SECOND) |
|---|---|
| $T_1''$-$T_2''$ | $+t_{P1}''$ |
| $T_2''$-$T_3''$ | $+t_{P2}''$ |
| $T_3''$-$T_4''$ | $+t_{P3}''$ |
| $T_4''$-$T_5''$ | $+t_{P4}''$ |
| ... | ... |

FIG. 4C-2

| TEMPERATURE DIFFERENCE OUTSIDE DEVICE (°C) | CORRECTION VALUE OF LAMINATION PREPARATION TIME (SECOND) |
|---|---|
| $T_1''$-$T_2''$ | $+t_{L1}''$ |
| $T_2''$-$T_3''$ | $+t_{L2}''$ |
| $T_3''$-$T_4''$ | $+t_{L3}''$ |
| $T_4''$-$T_5''$ | $+t_{L4}''$ |
| ... | ... |

FIG. 5A-2

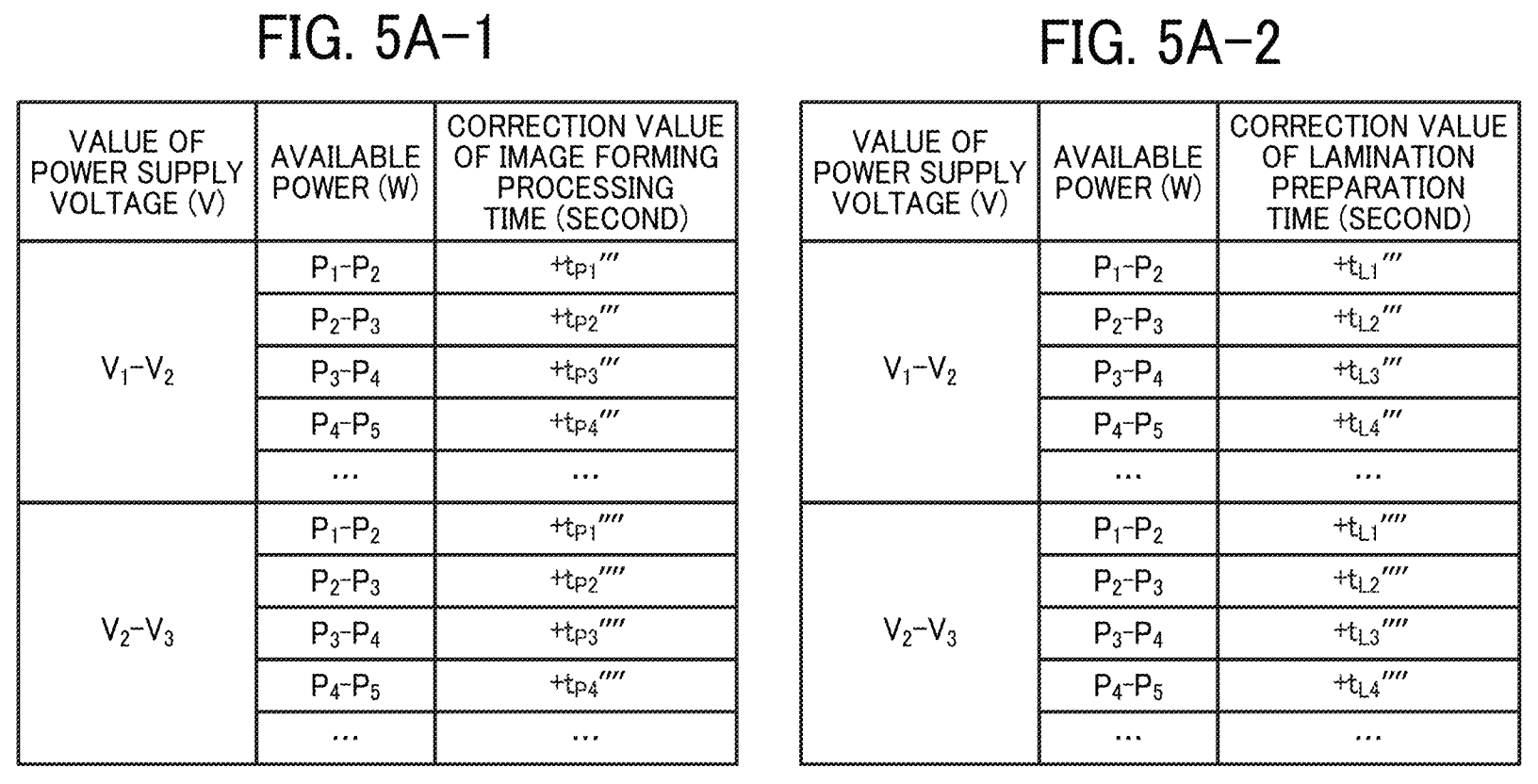

| VALUE OF POWER SUPPLY VOLTAGE (V) | AVAILABLE POWER (W) | CORRECTION VALUE OF LAMINATION PREPARATION TIME (SECOND) |
|---|---|---|
| $V_1-V_2$ | $P_1-P_2$ | $+t_{L1}'''$ |
| | $P_2-P_3$ | $+t_{L2}'''$ |
| | $P_3-P_4$ | $+t_{L3}'''$ |
| | $P_4-P_5$ | $+t_{L4}'''$ |
| | ... | ... |
| $V_2-V_3$ | $P_1-P_2$ | $+t_{L1}''''$ |
| | $P_2-P_3$ | $+t_{L2}''''$ |
| | $P_3-P_4$ | $+t_{L3}''''$ |
| | $P_4-P_5$ | $+t_{L4}''''$ |
| | ... | ... |

FIG. 5A-1

| VALUE OF POWER SUPPLY VOLTAGE (V) | AVAILABLE POWER (W) | CORRECTION VALUE OF IMAGE FORMING PROCESSING TIME (SECOND) |
|---|---|---|
| $V_1-V_2$ | $P_1-P_2$ | $+t_{P1}'''$ |
| | $P_2-P_3$ | $+t_{P2}'''$ |
| | $P_3-P_4$ | $+t_{P3}'''$ |
| | $P_4-P_5$ | $+t_{P4}'''$ |
| | ... | ... |
| $V_2-V_3$ | $P_1-P_2$ | $+t_{P1}''''$ |
| | $P_2-P_3$ | $+t_{P2}''''$ |
| | $P_3-P_4$ | $+t_{P3}''''$ |
| | $P_4-P_5$ | $+t_{P4}''''$ |
| | ... | ... |

IMAGE FORMING APPARATUS

CROSS-REFERENCE TO RELATED APPLICATION

This patent application is based on and claims priority pursuant to 35 U.S.C. § 119(a) to Japanese Patent Application No. 2023-198295, filed on Nov. 22, 2023, in the Japan Patent Office, the entire disclosure of which is hereby incorporated by reference herein.

BACKGROUND

Technical Field

The present disclosure relates to an image forming apparatus that performs a predetermined subsequent process subsequent to image forming processing.

Related Art

In general, an image forming apparatus preferably has a short time (so-called first copy out time) from the start of image forming processing to the output of a printed matter.

In this regard, a configuration is known that includes: an image forming preprocessing unit that performs processing necessary for starting image formation; an image forming post-processing unit that performs processing necessary for ending image formation; and a fixing temperature reaching time estimation unit that estimates a time until a temperature at which a transfer material can be thermally fixed by the fixing unit is reached, in which the engine control unit determines a timing to start operation of the image forming preprocessing unit by using the time notified by the printing start announcing unit, the time necessary for execution of the image forming preprocessing unit, and the time estimated by the fixing temperature reaching time estimation unit. According to the configuration, the time required for printout can be shortened.

Meanwhile, along with an increase in added value of image forming apparatuses, apparatuses have been developed that performs various processes (for example, lamination processing, case binding processing, and the like) after an image is formed on a sheet. Even in such apparatuses, it is preferable to reduce the first copy out time.

SUMMARY

The present disclosure described herein provides an image forming apparatus that includes a first heater, a second heater, and processing circuitry. The first heater is used in an image forming process. The second heater is used in a processing process after the image forming process. The processing circuitry is to measure a temperature of the first heater, measure a temperature of the second heater, and control start of the image forming process based on a first measured temperature of the first heater and a second measured temperature of the second heater.

The present disclosure described herein also provides an image forming method that includes first measuring, second measuring, and controlling. The first measuring measures a temperature of a first heater used in an image forming process. The second measuring measures a temperature of a second heater used in a processing process after the image forming process. The controlling controls start of the image forming process based on a first measured temperature measured by the first measuring and a second measured temperature measured by the second measuring.

The present disclosure described herein further provides a non-transitory recording medium soring computer-readable instructions which, when executed by one or more processors, cause the processors to execute a process. The process includes first measuring, second measuring, and controlling. The first measuring measures a temperature of a first heater used in an image forming process. The second measuring measures a temperature of a second heater used in a processing process after the image forming process. The controlling controls start of the image forming process based on a first measured temperature measured by the first measuring and a second measured temperature of the second heater measured by the second measuring.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 4A-1, 4A-2, 4B-1, 4B-2, 4C-1, and 4C-2 are diagrams each illustrating an example of a table stored in a storage unit according to each embodiment;

FIGS. 5A-1 and 5A-2 are diagrams each illustrating an example of a table stored in a storage unit according to each embodiment;

Figure 1:
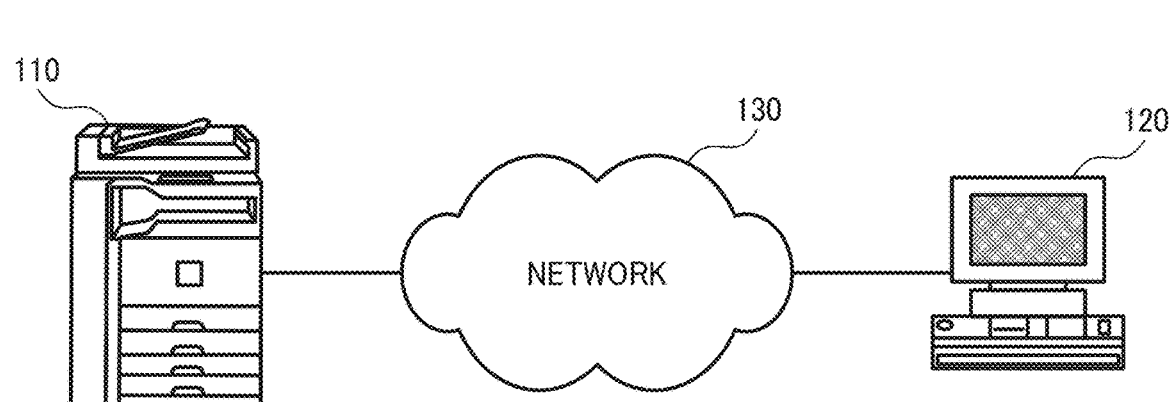
FIG. 1 is a diagram illustrating a schematic configuration of hardware of an entire system according to each embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Although embodiments of the present disclosure are described below, the embodiments of the present disclosure are not limited thereto. In the drawings referred below, the same or similar reference codes are used for the common or corresponding elements, and redundant descriptions are omitted as appropriate.

FIG. 1 is a diagram illustrating a schematic configuration of hardware of the entire system 100 according to each embodiment. FIG. 1 illustrates, as an example, an environment in which an image forming apparatus 110 and an information processing apparatus 120 are connected via a network 130 such as the Internet or a local area network (LAN). Note that a method of connecting from the image forming apparatus 110 or the information processing apparatus 120 to the network 130 may be either wired or wireless.

The image forming apparatus 110 is an apparatus that executes a print job to form an image on a paper surface. The image forming apparatus 110 can receive a print request from the information processing apparatus 120 via the network 130 and execute various processes such as a print job based on print settings. In addition, the image forming apparatus 110 according to each embodiment to be described can perform various processes such as lamination processing and case binding processing after forming an image on a sheet. The image forming apparatus 110 may be configured as a so-called multi-function peripheral (MFP).

The information processing apparatus 120 is, for example, an apparatus such as a personal computer, and can perform print settings of the image forming apparatus 110 in addition to transmitting a print job to the image forming apparatus 110 by being operated by a user.

In the embodiment to be described below, the configuration in which the image forming apparatus 110 performs lamination processing after the image formation is exemplified, and the present disclosure is not particularly limited to the embodiment. Therefore, in addition to the lamination processing, for example, the image forming apparatus 110 that performs case binding processing may be used.

Figures 2A, 2B:
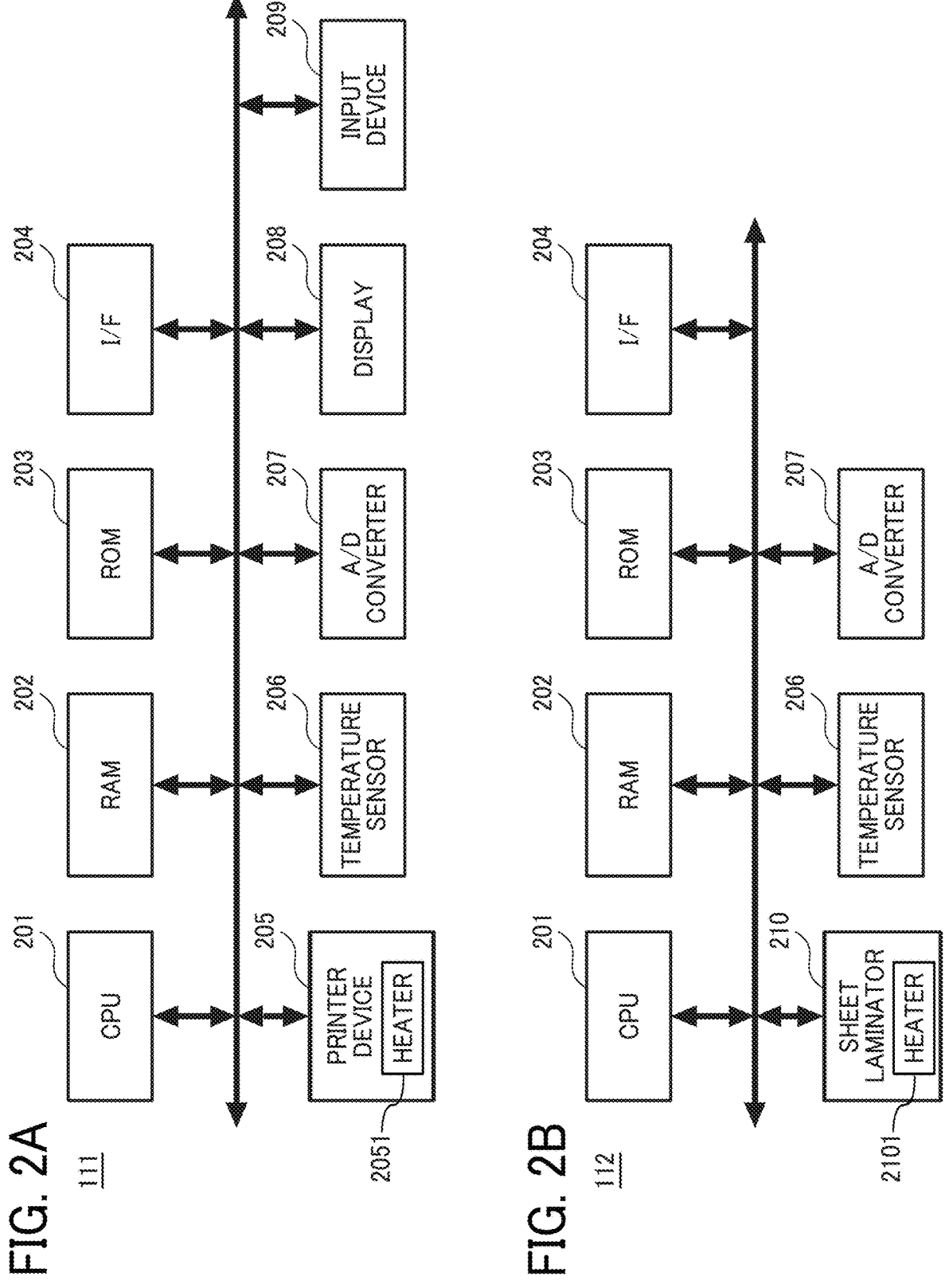
FIG. 2A and FIG. 2B are diagrams illustrating a hardware configuration included in the image forming apparatus according to each embodiment.

Next, a hardware configuration of the image forming apparatus 110 will be described. FIG. 2 is a diagram illustrating a hardware configuration included in the image forming apparatus 110 according to each embodiment. The image forming apparatus 110 according to the embodiment to be described includes an image forming apparatus body 111 that performs an image forming process and a laminator 112 that performs a processing process, such as lamination processing, after the image forming process. The image forming apparatus body 111 includes a central processing unit (CPU) 201, a random access memory (RAM) 202, a read only memory (ROM) 203, an interface (I/F) 204, a printer device 205, a temperature sensor 206, an analog to digital (A/D) converter 207, a display 208, and an input device 209, and each hardware is connected via a bus. The laminator 112 includes a CPU 201, a RAM 202, a ROM 203, an I/F 204, a sheet laminator 210, a temperature sensor 206, and an A/D converter 207, and the hardware is connected via a bus.

The CPU 201 is a device that executes a program for controlling operations of the image forming apparatus body 111 and the laminator 112 and performs predetermined processing. The RAM 202 is a volatile storage device to provide a work area for the CPU 201 executing programs. The RAM 202 is used to store and load programs and data. The ROM 203 is a nonvolatile storage device to store programs executed by the CPU 201, firmware, setting data, various data, and the like.

The I/F 204 is an interface device for connecting the image forming apparatus body 111 and the laminator 112. The I/F 204 of the image forming apparatus body 111 connects the image forming apparatus 110 and the network 130, and enables communication with other devices (for example, the information processing apparatus 120 or the like) via the network 130. Communication via the network 130 may be either wired communication or wireless communication, and various data can be transmitted and received using a predetermined communication protocol such as transmission control protocol/internet protocol (TCP/IP).

The printer device 205 is a device that forms an image on a sheet by a laser method or the like. The printer device 205 in each embodiment includes a heater 2051 (may be referred to as a first heater) as a fixing device for fixing a toner attached to the sheet. The heater 2051 constitutes a heating unit in each embodiment.

The temperature sensor 206 is a device that measures various temperatures, and constitutes a temperature measurement unit in each embodiment. The temperature sensor 206 in each embodiment can measure, for example, a temperature (may be referred to as a first measured temperature or a second measured temperature, respectively) of a heater included in the image forming apparatus body 111 or the laminator 112, a temperature inside a device such as the image forming apparatus body 111 or the laminator 112, a temperature outside a device such as the image forming apparatus body 111 or the laminator 112, and the like.

The A/D converter 207 is a device that converts an alternating current supplied from a commercial power supply into a direct current and supplies the direct current to various types of hardware constituting the image forming apparatus body 111 or the laminator 112. The A/D converter 207 in each embodiment can measure the value of the power supply voltage.

The display 208 is a device that displays various data, the state of the image forming apparatus 110, and the like to the user, and examples thereof include a liquid crystal display (LCD). The input device 209 is a device for a user to operate the image forming apparatus 110, and examples thereof include a physical button. Note that the display 208 and the input device 209 may be separate devices, or may be a device, such as a touch panel display, having both functions.

The sheet laminator 210 is a device that performs lamination processing by sandwiching an image-formed sheet output from the image forming apparatus body 111 between a pair of (two) films and heating and pressurizing the sheet. The sheet laminator 210 includes, for example, a unit that conveys a sheet, a unit that conveys a pair of films, a unit that peels off a film, a unit that presses a film sandwiching a sheet, and the like. The unit for pressing the film sandwiching the sheet can be configured as, for example, a roller including a heater 2101 (may be referred to as a second heater) as a heating unit.

Figure 3:
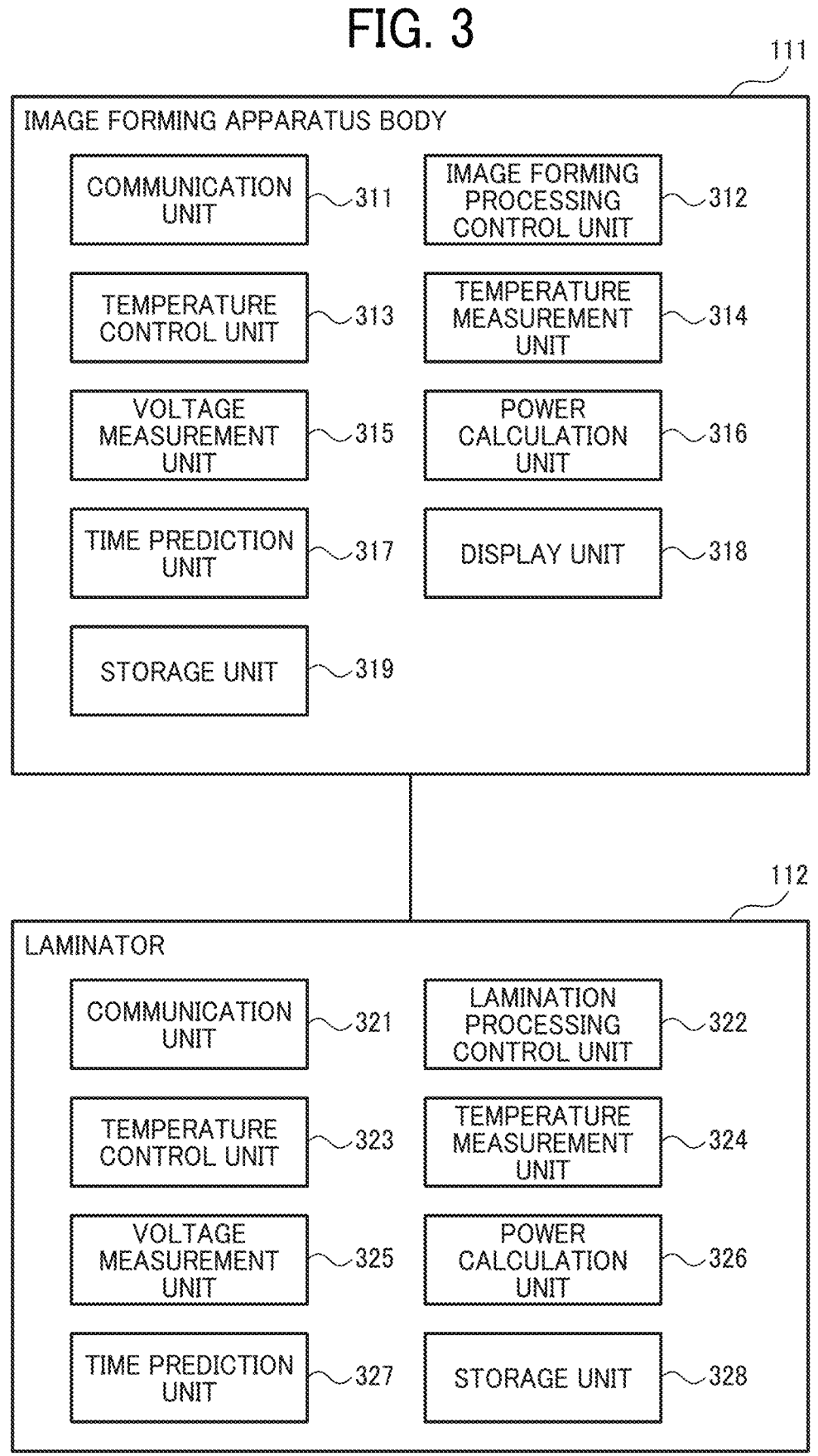
FIG. 3 is a software block diagram included in the image forming apparatus according to each embodiment.

The hardware configuration included in the image forming apparatus 110 according to each embodiment has been described above. Next, functional units executed by each piece of hardware in each embodiment will be described with reference to FIG. 3. FIG. 3 is a software block diagram included in the image forming apparatus 110 of each embodiment.

The image forming apparatus body 111 includes modules which are a communication unit 311, an image forming processing control unit 312, a temperature control unit 313, a temperature measurement unit 314, a voltage measurement unit 315, a power calculation unit 316, a time prediction unit 317, a display unit 318, and a storage unit 319, respectively. Furthermore, the laminator 112 includes modules which are a communication unit 321, a lamination processing control unit 322, a temperature control unit 323, a temperature measurement unit 324, a voltage measurement unit 325, a power calculation unit 326, a time prediction unit 327, and a storage unit 328, respectively. Hereinafter, details of each functional unit will be described.

First, functional units of the image forming apparatus body 111 will be described. The communication unit 311 constitutes a communication unit in each embodiment, and can communicate with other devices such as the laminator 112 and the information processing apparatus 120 by controlling the operation of the I/F 204. The communication unit 311 in each embodiment can receive, for example, a print job from the information processing apparatus 120 and various data from the laminator 112.

The image forming processing control unit 312 constitutes a control unit in each embodiment, and can form an image on a sheet by controlling the operation of the printer device 205 based on a print job. The image forming processing control unit 312 in each embodiment can start the image forming processing at a predetermined timing.

The temperature control unit 313 constitutes a temperature control unit in each embodiment, and can control the temperature of the heater 2051 included in the printer device 205. The temperature control unit 313 in each embodiment can raise the temperature of the heater 2051 to a predetermined temperature, for example, in response to a control signal from the image forming processing control unit 312.

The temperature measurement unit 314 constitutes a temperature measurement unit in each embodiment, and is a unit for measuring various temperatures by the temperature sensor 206. The temperature measurement unit 314 in each embodiment can be configured as, for example, a temperature measurement unit (may be referred to as a first temperature measurement unit) that measures the temperature of the heater 2051 of the printer device 205, a temperature measurement unit (may be referred to as a third temperature measurement unit) that measures the internal temperature of the image forming apparatus body 111, and a temperature measurement unit (may be referred to as a fourth temperature measurement unit) that measures the external temperature of the image forming apparatus body 111.

The voltage measurement unit 315 constitutes a voltage measurement unit (may be referred to as a first voltage measurement unit) in each embodiment, and can measure a voltage supplied to the heater 2051 of the image forming apparatus body 111. The voltage measurement unit 315 in each embodiment measures the voltage supplied to the heater 2051 by measuring the voltage output from the A/D converter 207.

The power calculation unit 316 constitutes a power calculation unit (may be referred to as a first power calculation unit) in each embodiment, and is a unit that calculates power that can be used by the heater 2051 included in the image forming apparatus body 111. For example, the power that can be used by the heater 2051 can be calculated by subtracting a value of the power used by the operating device other than the heater 2051 from a value of the maximum power that can be used by the image forming apparatus body 111. Examples of the device other than the heater 2051 include a sheet feeder, an exposure device, an intermediate transfer device, and a secondary transfer device. For example, in a case where the sheet feeder and the exposure device are being operating, a value obtained by subtracting the power used by the sheet feeder and the power used by the exposure device from a value of the maximum power that can be used by the image forming apparatus body 111 is the power that can be used by the heater 2051.

The time prediction unit 317 constitutes a time prediction unit in each embodiment, and can predict a time required from when the image forming apparatus body 111 starts image forming processing to when a sheet on which an image is formed is output to the laminator 112 (Hereinafter, referred to as "image forming processing time". The image forming processing time may be referred to as a first time). The time prediction unit 317 in each embodiment can predict the image forming processing time based on various measurement data by referring to the table stored in the storage unit 319. The image forming processing time predicted by the time prediction unit 317 can be calculated from the time for raising the temperature of the heater 2051 to a predetermined temperature, the time for conveying a sheet, the time for attaching and fixing a toner to the sheet, and the like. Here, the time for conveying a sheet, the time for attaching and fixing a toner to the sheet, and the like can be set as design values of the image forming apparatus body 111. The time for raising the temperature of the heater 2051 to a predetermined temperature can be predicted based on the temperature of the heater 2051.

The display unit 318 constitutes a display unit in each embodiment, and can display various types of information by controlling the operation of the display 208. The display unit 318 in each embodiment can display, for example, a screen related to print settings.

The storage unit 319 constitutes a storage unit in each embodiment, and can store various tables for calculating the image forming processing time. The storage unit 319 may be configured in the ROM 203 or may be configured in another storage medium (for example, a hard disk drive or the like).

Next, functional units of the laminator 112 will be described. The communication unit 321 constitutes a communication unit in each embodiment, and can communicate with the image forming apparatus body 111 by controlling the operation of the I/F 204. For example, the communication unit 321 in each embodiment can receive a lamination processing request from the image forming apparatus body 111 and transmit the time until the lamination processing is completed to the image forming apparatus body 111.

The lamination processing control unit 322 constitutes a control unit in each embodiment, and controls the operation of the sheet laminator 210 based on the lamination processing request, thereby performing lamination processing on the sheet. The image forming processing control unit 312 in each embodiment can start lamination processing at a predetermined timing.

The temperature control unit 323 constitutes a temperature control unit in each embodiment, and can control the temperature of the heater 2101 included in the sheet laminator 210. The temperature control unit 323 in each embodiment can raise the temperature of the heater 2101 to a predetermined temperature, for example, in response to a control signal from the lamination processing control unit 322.

The temperature measurement unit 324 constitutes a temperature measurement unit in each embodiment, and is a unit for measuring various temperatures by the temperature sensor 206. The temperature measurement unit 324 in each embodiment can be configured as, for example, a temperature measurement unit (may be referred to as a second temperature measurement unit) that measures the temperature of the heater 2101 of the sheet laminator 210, a temperature measurement unit (may be referred to as a fifth temperature measurement unit) that measures the internal temperature of the laminator 112, and a temperature measurement unit (may be referred to as a sixth temperature measurement unit) that measures the external temperature of the laminator 112.

The voltage measurement unit 325 constitutes a voltage measurement unit (may be referred to as a second voltage measurement unit) in each embodiment, and can measure the voltage supplied to the heater 2101 of the laminator 112. The voltage measurement unit 325 in each embodiment measures the voltage supplied to the heater 2101 by measuring the voltage output from the A/D converter 207.

The power calculation unit 326 constitutes a power calculation unit (may be referred to as a second power calculation unit) in each embodiment, and is a unit that calculates power which can be used by the heater 2101 included in the laminator 112. For example, the power calculation unit 326 can calculate the power that can be used by the heater 2101 by subtracting a value of power used by an operating device (for example, a sheet feeder, a peeling-off device, or the like) other than the heater 2101 from a value of the maximum power that can be used by the laminator 112.

The time prediction unit 327 constitutes a time prediction unit in each embodiment, and can predict a time until the laminator 112 performs lamination processing (Hereinafter, referred to as "lamination preparation time". The lamination preparation time may be referred to as a second time). The time prediction unit 327 in each embodiment can predict the lamination preparation time based on various kinds of measurement data by referring to the table stored in the storage unit 328. The lamination preparation time predicted by the time prediction unit 327 can be calculated from the time for raising the temperature of the heater 2101 to a predetermined temperature, the time required for conveying and peeling off the film for lamination, and the like.

The storage unit 328 constitutes a storage unit in each embodiment, and can store various tables for calculating the lamination preparation time. The storage unit 319 may be configured in the ROM 203 or may be configured in another storage medium (for example, a hard disk drive or the like).

The software blocks described above correspond to the functional units realized by the CPU 201 executing the programs of each of the embodiments to make the respective hardware function. In any one of the embodiments, all of the functional units may be implemented by software, hardware, or a combination of software and hardware.

Furthermore, each functional unit described above does not necessarily have to be included in the configuration illustrated in FIG. 3. For example, in another preferred embodiment, each functional unit may be realized by cooperation of the image forming apparatus body 111 and the laminator 112.

Next, tables stored in the above-described storage units 319 and 328 will be described with reference to FIG. 4(A-1) to FIG. 5(A-2). FIG. 4(A-1) to FIG. 5(A-2) are diagrams illustrating examples of tables stored in the storage units 319 and 328 according to each embodiment.

FIG. 4(A-1) is a table in which the temperature of the heater and the image forming processing time are associated with each other. FIG. 4(A-2) is a table in which the temperature of the heater and the lamination preparation time are associated with each other.

For example, in a case where the value of the temperature of the heater measured by the temperature sensor 206 that measures the temperature of the heater 2051 inside the image forming apparatus body 111 is T1 to T2° C., the time prediction unit 317 of the image forming apparatus body 111 refers to the table of FIG. 4(A-1) to predict that the image forming processing time is TP1 seconds. When the value of the temperature of the heater measured by the temperature sensor 206 that measures the temperature of the heater 2101 inside the laminator 112 is T1 to T2° C., the time prediction unit 327 of the laminator 112 refers to the table of FIG. 4(A-2) to predict that the lamination preparation time is TL1 seconds.

FIG. 4(B-1) is a table in which the temperature inside the image forming apparatus body 111 is associated with the correction value of the image forming processing time. FIG. 4(B-2) is a table in which the temperature inside the laminator 112 is associated with the correction value of the lamination preparation time.

For example, in a case where the value measured by the temperature sensor 206 that measures the temperature inside the image forming apparatus body 111 is T1' to T2'° C., the time prediction unit 317 of the image forming apparatus body 111 refers to the table of FIG. 4(B-1) to correct the image forming processing time by +TP1' seconds. In addition, in a case where the value measured by the temperature sensor 206 that measures the temperature inside the laminator 112 is T1' to T2'° C., the time prediction unit 327 of the laminator 112 refers to the table of FIG. 4(B-2) to correct the image forming processing time by +TL1' seconds.

FIG. 4(C-1) is a table in which the temperature outside the image forming apparatus body 111 is associated with the correction value of the image forming processing time. FIG. 4(C-2) is a table in which the temperature outside the laminator 112 is associated with the correction value of the lamination preparation time.

For example, in a case where the value measured by the temperature sensor 206 that measures the temperature outside the image forming apparatus body 111 is T1" to T2"° C., the time prediction unit 317 of the image forming apparatus body 111 refers to the table of FIG. 4(C-1) to correct the image forming processing time by +TP1" seconds. In addition, in a case where the value measured by the temperature sensor 206 that measures the temperature outside the laminator 112 is T1" to T2"° C., the time prediction unit 327 of the laminator 112 refers to the table of FIG. 4(C-2) to correct the image forming processing time by +TL1" seconds.

FIG. 5(A-1) is a table in which the power supply voltage value and the available power of the image forming apparatus body 111 are associated with the correction value of the image forming processing time. FIG. 5(A-2) is a table in which the power supply voltage value and the available power of the laminator 112 are associated with the correction value of the lamination preparation time.

For example, in a case where the power supply voltage value of the image forming apparatus body 111 is V1 to V2 volts and the available power of the image forming apparatus body 111 is P1 to P2 W, the time prediction unit 317 of the image forming apparatus body 111 refers to the table of FIG. 5(A-1) to correct the image forming processing time by +TP1''' seconds. In addition, in a case where the power supply voltage value of the laminator 112 is V1 to V2 volts and the available power of the laminator 112 is P1 to P2 W, the time prediction unit 327 of the laminator 112 refers to the table of FIG. 5(A-2) to correct the image forming processing time by +TL1'" seconds.

Note that the tables illustrated in FIGS. 4(A-1), 4(B-1), 4(C-1), and 5(A-1) are stored in the storage unit 319 of the image forming apparatus body 111. In addition, the tables illustrated in FIGS. 4(A-2), 4(B-2), 4(C-2), and 5(A-2) are stored in the storage unit 328 of the laminator 112.

Hereinafter, more specific embodiments will be described in detail. First, a first embodiment will be described with reference to FIGS. 6 to 9.

Figure 6:
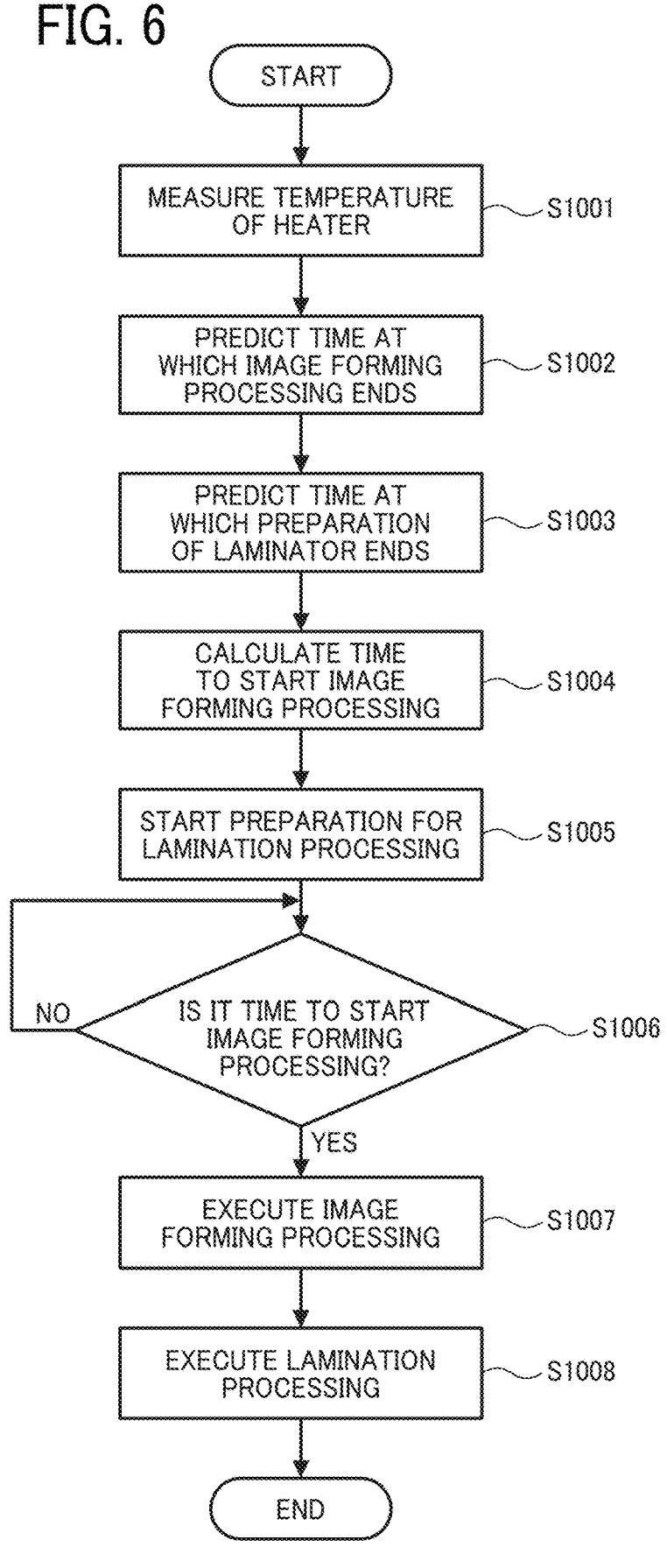
FIG. 6 is a flowchart illustrating processing executed by the image forming apparatus in a first embodiment.

FIG. 6 is a flowchart illustrating processing executed by the image forming apparatus 110 in the first embodiment. The image forming apparatus 110 starts processing by receiving the print job.

Next, in step S1001, the temperature measurement unit 314 of the image forming apparatus body 111 measures the temperature of the heater 2051 of the image forming apparatus body 111. In step S1001, the temperature measurement unit 324 of the laminator 112 also measures the temperature of the heater 2101 of the laminator 112. Note that the value of the measured temperature is output to each of the time prediction units 317 and 327.

In step S1002, the time prediction unit 317 of the image forming apparatus body 111 predicts the time at which the image forming processing ends. The time prediction unit 317 can predict the image forming processing time based on the temperature value measured in step S1001 with reference to the table of FIG. 4(A-1). The predicted image forming processing time is output to the image forming processing control unit 312.

Furthermore, in step S1003, the time prediction unit 327 of the laminator 112 predicts the time at which the preparation of the laminator 112 ends. The time prediction unit 327 can predict the lamination preparation time based on the temperature measured in step S1001 with reference to the table of FIG. 4(A-2). The predicted lamination preparation time is output to the image forming processing control unit 312. Note that the processing of steps S1002 and S1003 may be performed in the order opposite to that in FIG. 6 or may be performed in parallel with that in FIG. 6.

Thereafter, in step S1004, the image forming processing control unit 312 calculates the time to start the image forming processing. In the present embodiment, the image forming processing control unit 312 can calculate the time to start the image forming processing from a difference between the lamination preparation time and the image forming processing time. For example, in a case where the predicted lamination preparation time is TL seconds and the predicted image forming processing time is TP seconds, the time to start the image forming processing is calculated to be TL–TP seconds after the preparation of the laminator 112 is started. That is, when the image forming processing is started after TL–TP seconds from the start of the preparation of the laminator 112, a sheet on which an image is formed can be output at the timing when the preparation of the laminator 112 is completed, and the first copy out time can be shortened.

Next, in step S1005, the lamination processing control unit 322 starts preparation for the lamination processing. The preparation for the lamination processing is, for example, temperature raising of the heater 2101 of the laminator 112, conveyance and peeling-off of a film, and the like. The temperature of the heater in step S1005 can be raised by the temperature control unit 323.

In subsequent step S1006, processing branches depending on whether or not it is time to start the image forming processing. The determination in step S1006 can be made based on, for example, whether or not the time elapsed from the start of the preparation for the lamination processing has reached the time calculated in step S1004. In a case where it is not time to start the image forming processing (NO), processing returns to step S1006, and processing is repeated until it is time to start the image forming processing. In a case where it is time to start the image forming processing (YES), processing proceeds to step S1007.

In step S1007, the image forming processing control unit 312 executes image forming processing. The image forming processing of step S1007 is, for example, a series of processing such as temperature raising of the heater, conveyance of a sheet, formation of an electrostatic latent image on a sheet, adhesion of toner, and fixing of toner by heating. The temperature of the heater can be raised by the temperature control unit 313. The sheet on which the image is formed in step S1007 is output to the laminator 112.

In step S1008, the lamination processing control unit 322 performs lamination processing on the sheet on which the image is formed in step S1007. Here, since the image forming processing is started in such a manner that completion of the image forming processing matches the timing of completion of the preparation of the laminator 112, the lamination processing control unit 322 can perform the processing of step S1008 in accordance with the end of the processing of step S1007. Then, the image forming apparatus 110 ends the process.

The processing illustrated in FIG. 6 allows the image forming apparatus 110 to match the timing at which the image forming processing is completed with the timing at which the preparation of the laminator 112 is completed. Therefore, it is possible to shorten the first copy out time while suppressing unnecessary power consumption.

Figure 7:
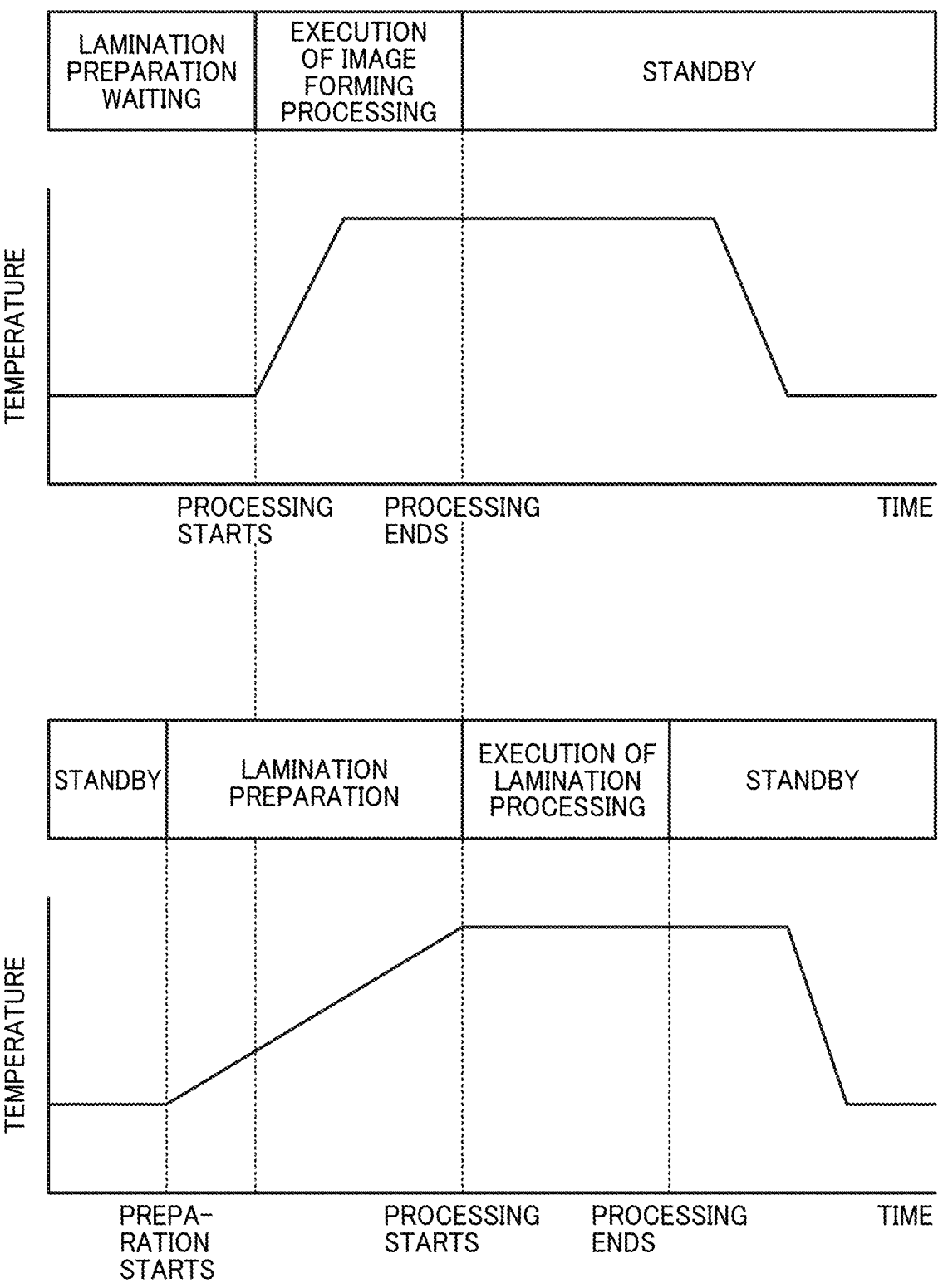
FIG. 7 is a diagram illustrating an example of a timing chart according to the first embodiment.

FIG. 7 is a diagram illustrating an example of a timing chart according to the first embodiment. The upper diagram of FIG. 7 illustrates an example of temporal transition of the temperature of the heater 2051 of the image forming apparatus body 111, and the lower diagram of FIG. 7 illustrates an example of temporal transition of the temperature of the heater 2101 of the laminator 112. Here, the lamination preparation time is longer than the image forming processing time. Therefore, in order to shorten the first copy out time while suppressing unnecessary power consumption, preparation of the laminator 112 is started prior to the start of the image forming processing.

As illustrated in FIG. 7, the laminator 112 shifts from the standby state to the lamination preparation state in response to a print job request from the image forming apparatus 110 (step S1005 in FIG. 6). The laminator 112 performs lamination preparation by raising the temperature of the heater to a predetermined temperature or peeling off the film and conveying the film to a predetermined position.

Thereafter, when the timing to start the image forming processing is reached (YES in step S1006 in FIG. 6), the image forming apparatus body 111 shifts from the lamination preparation waiting state to a mode of executing the image forming processing. The image forming processing is processing of step S1007 in FIG. 6. When the image forming processing is completed, the sheet is output to the laminator 112. Note that after completion of the image forming processing, the image forming apparatus body 111 shifts to a mode of standby for a print job, and when a predetermined time elapses, the temperature of the heater is lowered, so that power consumption can be reduced.

At this time, as illustrated in FIG. 7, the timing at which the image forming processing ends and the timing at which the preparation for lamination is completed are the same. Therefore, at the same time as the preparation for lamination is completed, the sheet is conveyed from the image forming apparatus body 111 to the laminator 112, and the laminator 112 can execute the lamination processing without a standby time (step S1008 in FIG. 6). Note that after completion of the lamination processing, the laminator 112 shifts to the standby mode, and when a predetermined time elapses, the temperature of the heater is lowered, so that power consumption can be reduced.

Figure 8:
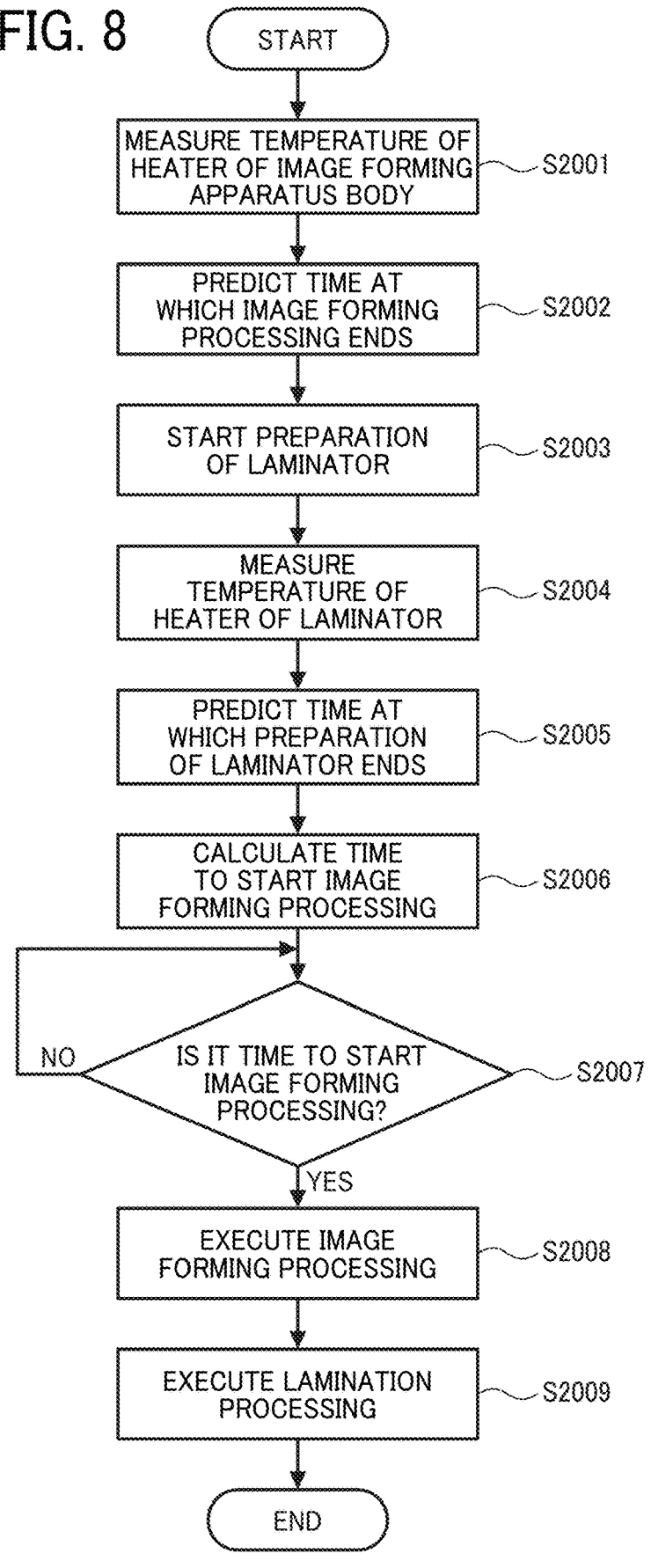
FIG. 8 is a flowchart illustrating processing executed by the image forming apparatus in a second embodiment.

Next, a second embodiment will be described with reference to FIG. 8. In the second embodiment, the temperature of the heater 2101 of the laminator 112 is measured a plurality of times, and the lamination preparation time is predicted based on a plurality of measurement results. FIG. 8 is a flowchart illustrating processing executed by the image forming apparatus 110 in the second embodiment. Note that, in the description of FIG. 8, description common to processing described in the flowchart of FIG. 6 will be omitted as appropriate.

When the image forming apparatus 110 starts processing from step S2000, in step S2001, the temperature measurement unit 314 of the image forming apparatus body 111 measures the temperature of the heater 2051 of the image forming apparatus body 111. Note that the value of the measured temperature is output to the time prediction unit 317.

In step S2002, the time prediction unit 317 of the image forming apparatus body 111 predicts the time at which the image forming processing ends. The processing of step S2002 is similar to the processing of step S1002 in FIG. 6.

Thereafter, in step S2003, the lamination processing control unit 322 starts preparation of the laminator 112. The processing of step S2003 is similar to the processing of step S1005 in FIG. 6.

Next, in step S2004, the temperature measurement unit 324 of the laminator 112 measures the temperature of the heater 2101 of the laminator 112. Here, the temperature measurement unit 324 measures a plurality of times the temperature of the heater 2101 during temperature raising. Note that the value of the measured temperature is output to the time prediction unit 327.

In step S2005, the time prediction unit 327 predicts a time at which the preparation of the laminator 112 ends. In the second embodiment, the time prediction unit 327 predicts the lamination preparation time based on a plurality of temperature values measured in step S2004. Furthermore, the time prediction unit 327 can predict the lamination preparation time by, for example, linearly approximating a plurality of measurement results. The prediction of the lamination preparation time in the second embodiment is not limited to linear approximation, and can be performed by various methods. The predicted lamination preparation time is output to the image forming processing control unit 312.

Thereafter, in step S2006, the image forming processing control unit 312 calculates the time to start the image forming processing. The processing of step S2006 is similar to the processing of step S1004 in FIG. 6.

In subsequent step S2007, processing branches depending on whether or not it is time to start the image forming processing. The processing of step S2007 is similar to the processing of step S1006 in FIG. 6. In a case where it is not time to start the image forming processing (NO), processing returns to step S2007, and processing is repeated until it is time to start the image forming processing. In a case where it is time to start the image forming processing (YES), processing proceeds to step S2008.

Thereafter, image forming processing is executed in step S2008, and lamination processing is executed in step S2009. Note that the processing of steps S2008 and S2009 is similar to the processing of steps S1007 and S1008 in FIG. 6. Then, the image forming apparatus 110 ends the process.

The processing illustrated in FIG. 8 allows the image forming apparatus 110 to match the timing at which the image forming processing is completed with the timing at which the preparation of the laminator 112 is completed. Therefore, it is possible to shorten the first copy out time while suppressing unnecessary power consumption. Furthermore, by predicting the lamination preparation time based on the result of measuring a plurality of times the temperature of the heater 2101 of the laminator 112, the accuracy of the prediction can be improved, and the occurrence of a sheet-paper jam due to the deviation of the prediction time can be suppressed.

Note that, also in the second embodiment, a timing chart similar to the timing chart of the first embodiment illustrated in FIG. 7 is obtained.

Figure 9:
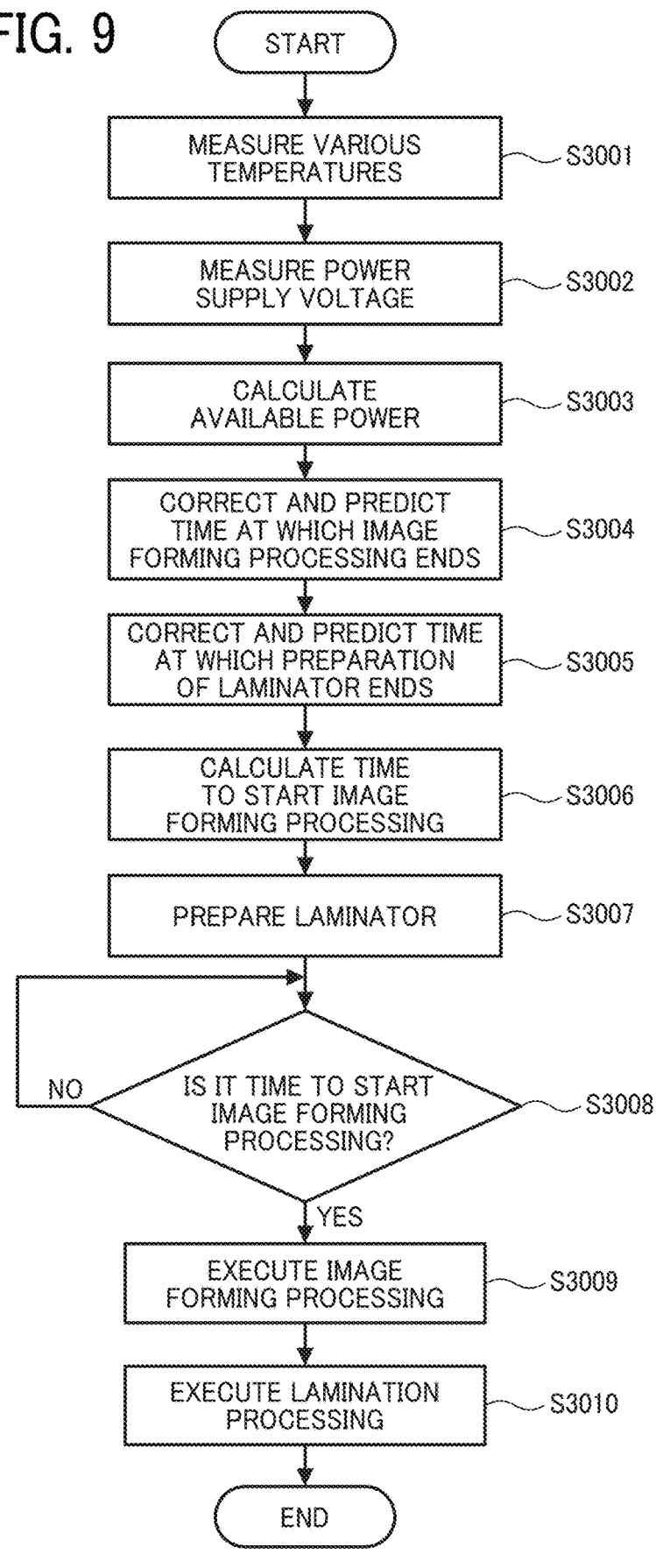
FIG. 9 is a flowchart illustrating processing executed by the image forming apparatus in a third embodiment.

Next, a third embodiment will be described with reference to FIG. 9. In the third embodiment, temperatures inside and outside the image forming apparatus body 111 and the laminator 112, available power, and the like are measured, and the image forming processing time, the lamination preparation time, and the like are corrected, thereby predicting a more accurate time. FIG. 9 is a flowchart illustrating processing executed by the image forming apparatus 110 in the third embodiment. Note that, in the description of FIG. 9, description common to processing described in the flowchart of FIG. 6 will be appropriately omitted.

When the image forming apparatus 110 starts processing, in step S3001, various temperatures and voltages are measured. In step S3001, the temperature measurement unit 314 of the image forming apparatus body 111 measures the temperature of the heater 2051 of the image forming apparatus body 111 and the internal and external temperatures of the image forming apparatus body 111. In step S3001, the temperature measurement unit 324 of the laminator 112 also measures the temperature of the heater 2101 of the laminator 112 and the internal and external temperatures of the laminator 112. Note that the measured values of the various temperatures are output to the time prediction units 317 and 327.

Next, in step S3002, the voltage measurement unit 315 measures the power supply voltage of the image forming apparatus body 111. In step S3002, the voltage measurement unit 325 also measures the power supply voltage of the laminator 112. The measurement of the voltage in step S3002 can be performed via the A/D converter 207. The measured voltage value is output to the time prediction units 317 and 327.

Thereafter, in step S3003, the power calculation unit 316 calculates available power of the heater 2051 of the image forming apparatus body 111. In step S3003, the power calculation unit 326 also calculates available power of the heater 2101 of the laminator 112. The value of the power calculated in step S3003 is output to the time prediction units 317 and 327.

Next, in step S3004, the time prediction unit 317 calculates a corrected prediction value of the time at which the image forming processing ends. Here, the time prediction unit 317 predicts the image forming processing time based on the temperature of the heater 2051 with reference to the table of FIG. 4A-1. In addition, the time prediction unit 317 refers to the table of FIG. 4B-1 to obtain a correction value based on the internal temperature of the image forming apparatus body 111, refers to the table of FIG. 4C-1 to obtain a correction value based on the external temperature of the image forming apparatus body 111, and refers to the table of FIG. 5A-1 to obtain a correction value based on the power supply voltage and the available power. Then, the time prediction unit 317 corrects the prediction value of the image forming processing time according to these correction values. The corrected image forming processing time is output to the image forming processing control unit 312.

Next, in step S3005, the time prediction unit 327 calculates a corrected prediction value of the time at which the preparation of the laminator 112 ends. Here, the time prediction unit 327 predicts the image forming processing time based on the temperature of the heater 2101 with reference to the table of FIG. 4A-2. Furthermore, the time prediction unit 317 refers to the table of FIG. 4B-2 to obtain a correction value based on the internal temperature of the laminator 112, refers to the table of FIG. 4C-2 to obtain a correction value based on the external temperature of the laminator 112, and refers to the table of FIG. 5A-2 to obtain a correction value based on the power supply voltage and the available power. Then, the time prediction unit 327 corrects the prediction value of the lamination preparation time according to these correction values. The corrected prediction value of the lamination preparation time is output to the image forming processing control unit 312.

Thereafter, in step S3006, the image forming processing control unit 312 calculates the time to start the image forming processing. In the present embodiment, the image forming processing control unit 312 can calculate the time to start the image forming processing from a difference between the lamination preparation time and the image forming processing time. For example, in a case where the lamination preparation time predicted by the correction is TL seconds and the image forming processing time predicted by the correction is TP seconds, the time to start the image forming processing is calculated to be TL–TP seconds after the preparation of the laminator 112 is started. That is, in a case where the image forming processing is started after TL–TP seconds from the start of the preparation of the laminator 112, a sheet on which an image is formed can be output at the timing when the preparation of the laminator 112 is completed, and the first copy out time can be shortened.

Thereafter, the processing of steps S3007 to S3010 is performed, and the process ends. Note that the processing of steps S3007 to S3010 is similar to the processing of steps S1005 to S1008 in FIG. 6, and thus description thereof is omitted.

The processing illustrated in FIG. 9 allows the image forming apparatus 110 to match the timing at which the image forming processing is completed with the timing at which the preparation of the laminator 112 is completed. Therefore, it is possible to shorten the first copy out time while suppressing unnecessary power consumption. Furthermore, by correcting the image forming processing time and the lamination preparation time according to correction values based on various measurements, the accuracy of prediction can be improved, and the occurrence of a sheet-paper jam due to the deviation of the prediction time can be suppressed.

Also in the third embodiment, a timing chart similar to the timing chart of the first embodiment illustrated in FIG. 7 is obtained.

Regarding the image forming apparatus body 111 and the laminator 112, the third embodiment described with reference to FIG. 9 is an embodiment including correction values based on temperatures inside devices, correction values based on temperatures outside devices, and correction values based on power supply voltages and available powers, and all these correction values may not necessarily be included. Therefore, one or more of the correction values described above may be used.

Figure 10:
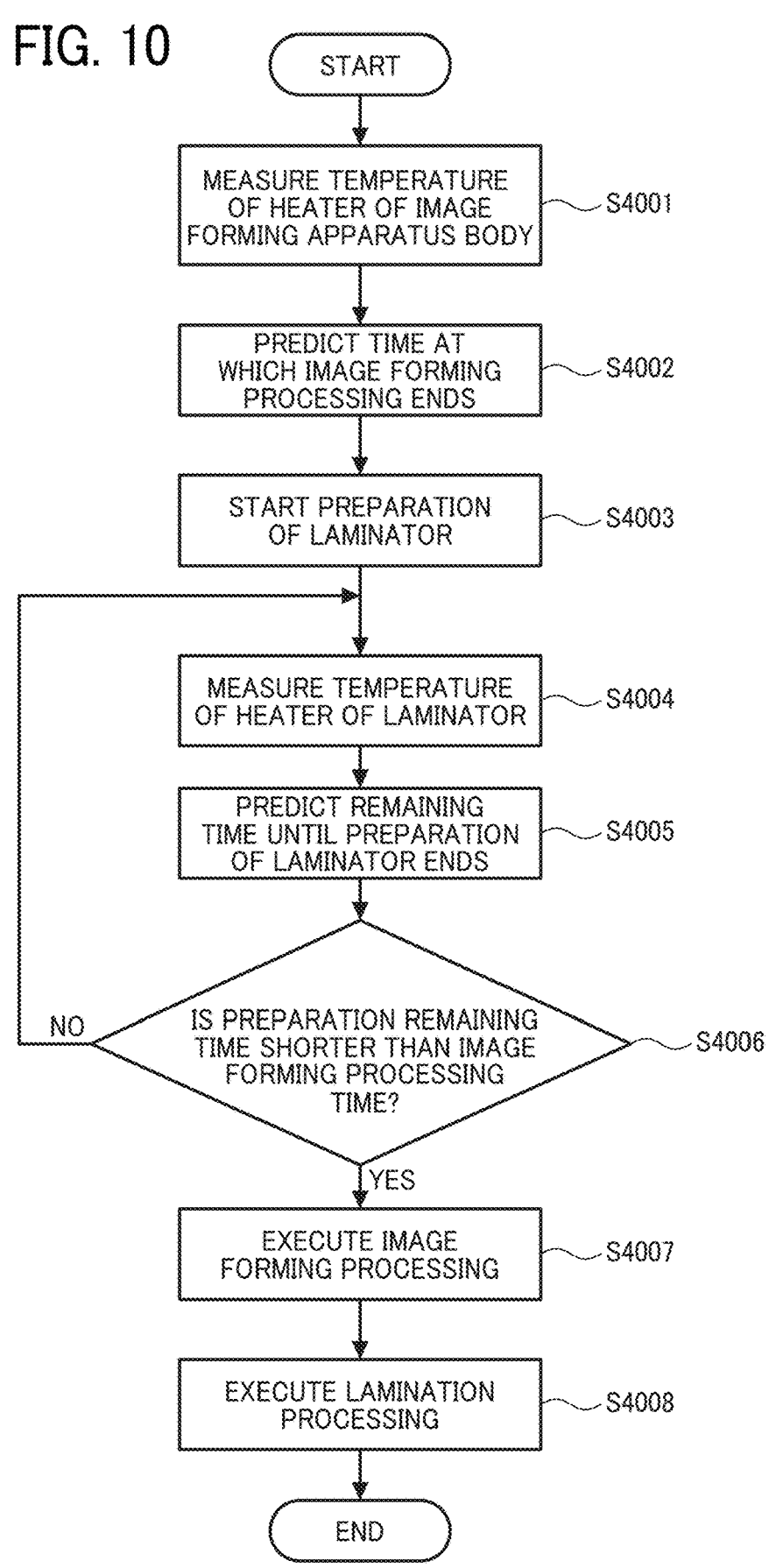
FIG. 10 is a flowchart illustrating processing executed by the image forming apparatus in a fourth embodiment.

Next, a fourth embodiment will be described with reference to FIG. 10. In the fourth embodiment, the remaining time of the lamination preparation time is calculated and compared with the image forming processing time to determine the timing to start the image forming processing. FIG. 10 is a flowchart illustrating processing executed by the image forming apparatus 110 in the fourth embodiment. Note that, in the description of FIG. 10, description of processing common to processing described in the flowcharts of other embodiments will be omitted as appropriate.

When the image forming apparatus 110 starts processing, in step S4001, the temperature measurement unit 314 of the image forming apparatus body 111 measures the temperature of the heater 2051 of the image forming apparatus body 111. In addition, in step S4002, the time prediction unit 317 of the image forming apparatus body 111 predicts the time at which the image forming processing ends. Thereafter, in step S4003, the lamination processing control unit 322 starts preparation of the laminator 112. Note that the processing of steps S4001 to S4003 is similar to the processing of steps S2001 to S2003 in FIG. 8.

Next, in step S4004, the temperature measurement unit 324 measures the temperature of the heater 2101 of the laminator 112. Thereafter, in step S4005, the time prediction unit 327 predicts the remaining time (hereinafter, referred to as "preparation remaining time") required until the preparation of the laminator 112 is completed based on the temperature measured in step S4004. The predicted preparation remaining time is output to the image forming processing control unit 312.

Subsequently, in step S4006, processing branches depending on whether or not the preparation remaining time predicted in step S4004 is shorter than the image forming processing time predicted in step S4002. In a case where the preparation remaining time is longer than the image forming processing time (NO), processing returns to step S4004. That is, in a case where the image forming processing is executed at this time point, since the preparation of the laminator 112 is not completed when the sheet on which the image is formed and output reaches the laminator 112, the lamination processing cannot be performed, which may cause a sheet-paper jam. Therefore, the temperature of the heater 2101 of the laminator 112 is measured again (step S4004), and the preparation remaining time is predicted (step S4005). As a result, the image forming processing can stand by until an appropriate timing to start the image forming processing.

On the other hand, in a case where the preparation remaining time is shorter than an image formation time in step S4006 (YES), processing proceeds to step S4007. In step S4007, the image forming processing control unit 312 executes image forming processing. That is, the image forming processing is started when the preparation remaining time becomes shorter than the image formation time. As a result, the timing at which the preparation of the laminator 112 is completed can be matched with the timing at which the image forming processing is completed, and the first copy out time can be shortened.

Next, in step S4008, lamination processing is executed. The processing of step S2003 is similar to the processing of step S1008 in FIG. 6.

Then, the image forming apparatus 110 ends the process.

The processing illustrated in FIG. 10 allows the image forming apparatus 110 to match the timing at which the image forming processing is completed with the timing at which the preparation of the laminator 112 is completed. Therefore, it is possible to shorten the first copy out time while suppressing unnecessary power consumption. Furthermore, the preparation remaining time is predicted based on the temperature measured during the temperature raising of the heater 2101 of the laminator 112, and the predicted preparation remaining time is compared with the image forming processing time to determine the timing to start the image forming processing, whereby the timing to complete the image forming processing and the timing to complete the preparation of the laminator 112 can be matched with higher accuracy.

Figure 11:
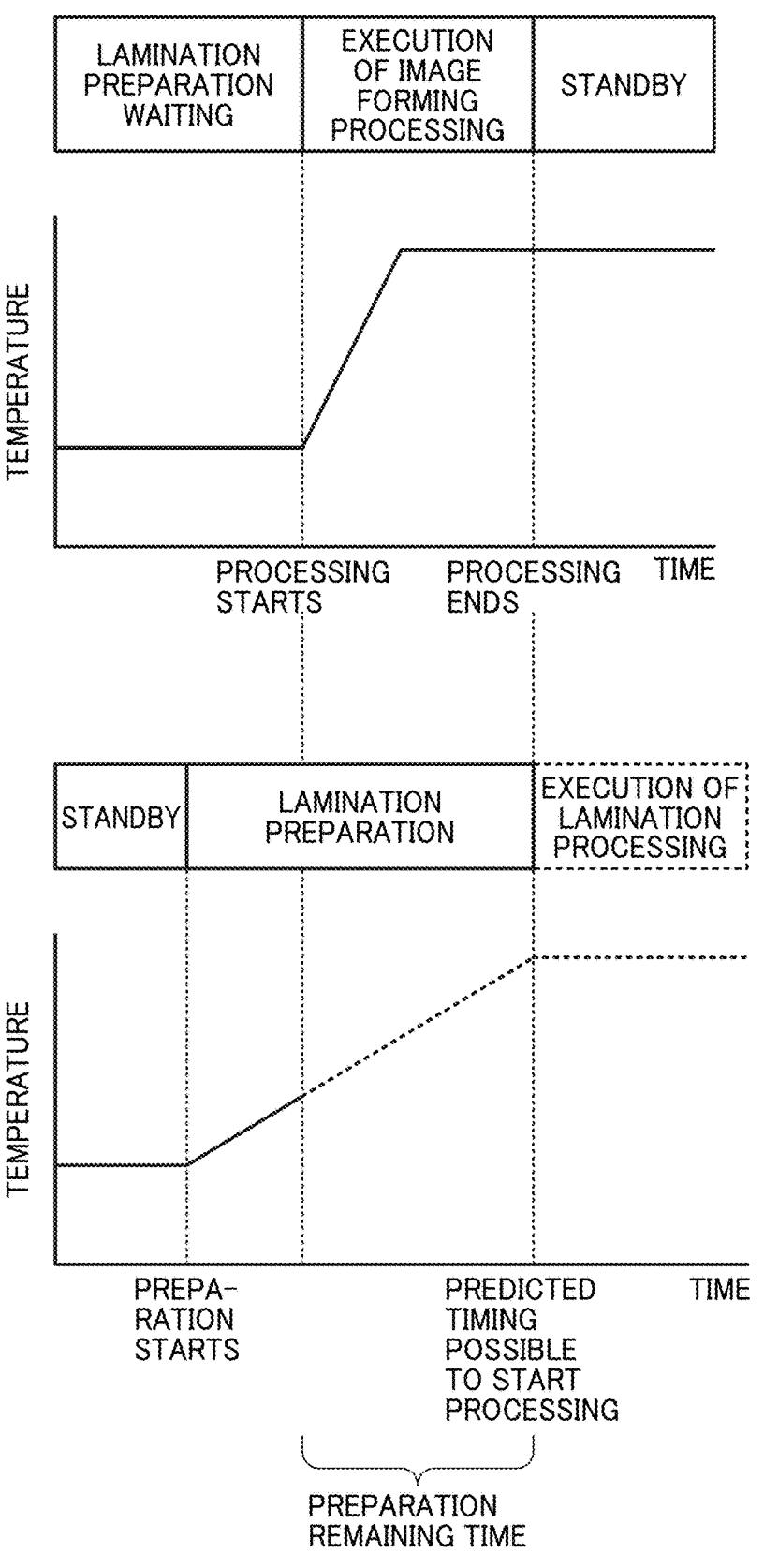
FIG. 11 is a diagram illustrating an example of a timing chart according to the fourth embodiment.

FIG. 11 is a diagram illustrating an example of a timing chart according to a fourth embodiment. The upper diagram of FIG. 11 illustrates an example of temporal transition of the temperature of the heater 2051 of the image forming apparatus body 111, and the lower diagram of FIG. 11 illustrates an example of temporal transition of the temperature of the heater 2101 of the laminator 112.

As illustrated in FIG. 11, the laminator 112 shifts from the standby state to the lamination preparation state in response to a print job request from the image forming apparatus 110 (step S4003 in FIG. 10). In addition, the temperature measurement unit 324 of the laminator 112 measures the temperature of the heater 2101 of the laminator 112, and the time prediction unit 327 predicts the preparation remaining time (steps S4004 and S4005 in FIG. 10).

Then, the preparation remaining time is compared with the image forming processing time, and at the timing when the preparation remaining time becomes shorter than the image forming processing time (YES in step S4006 in FIG. 10), the image forming apparatus body 111 shifts from the lamination preparation waiting state to a mode of executing the image forming processing.

With the process of the fourth embodiment described with reference to FIGS. 10 and 11, it is possible to shorten the first copy out time while suppressing unnecessary power consumption.

Figure 12:
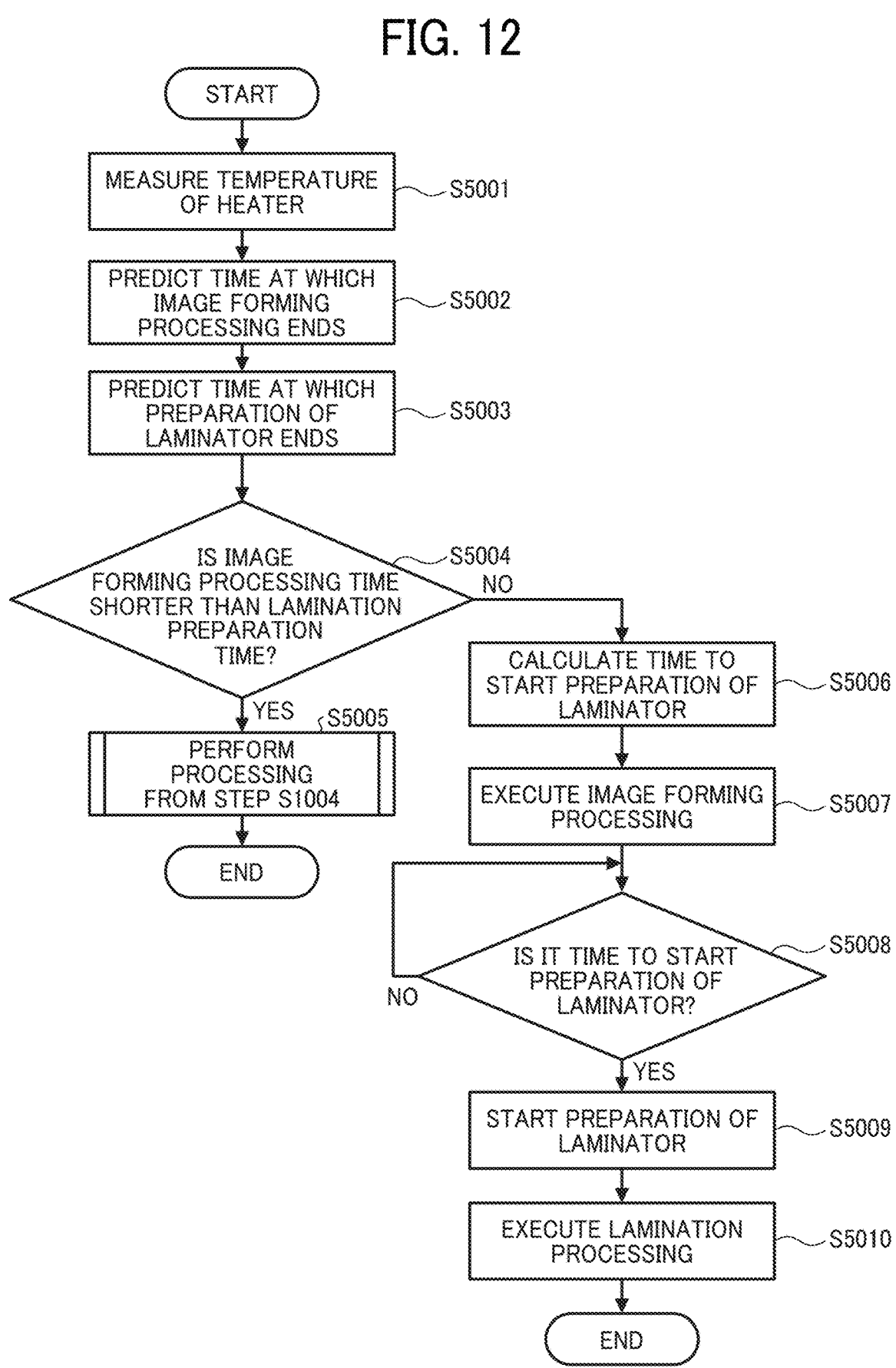
FIG. 12 is a flowchart illustrating processing executed by the image forming apparatus in a fifth embodiment.

Next, a fifth embodiment will be described with reference to FIGS. 12 and 13. In the first embodiment and the like, processing is performed on the premise that the lamination preparation time is shorter than the image forming processing time. However, which of the image forming processing time and the lamination preparation time is shorter may be unknown until the temperature of the heater is measured and the time is predicted. Therefore, in the fifth embodiment, the image forming processing time and the lamination preparation time are compared, and the more time-consuming processing is performed first. FIG. 12 is a flowchart illustrating processing executed by the image forming apparatus 110 in the fifth embodiment. Note that, in the description of FIG. 12, description of processing common to processing described in the flowcharts of other embodiments will be omitted as appropriate.

When the image forming apparatus 110 starts processing, in step S5001, the temperature measurement unit 314 of the image forming apparatus body 111 measures the temperature of the heater 2051 of the image forming apparatus body 111. In step S5001, the temperature measurement unit 324 of the laminator 112 also measures the temperature of the heater 2101 of the laminator 112. Note that the processing of step S5001 is similar to the processing of step S1001 described in FIG. 6.

Thereafter, in step S5002, the time prediction unit 317 of the image forming apparatus body 111 predicts the time at which the image forming processing ends. Furthermore, in step S5003, the time prediction unit 327 of the laminator 112 predicts the time at which the preparation of the laminator 112 ends. Note that the processing of steps S5002 and S5003 is similar to the processing of steps S1002 and S1003 described in FIG. 6.

Next, in step S5004, processing is branched depending on whether or not the image forming processing time is shorter than the lamination preparation time. In a case where the image forming processing time is shorter than the lamination preparation time (YES), processing proceeds to step S5005. In step S5005, processing from step S1004 in FIG. 6 is performed.

On the other hand, in a case where the image forming processing time is longer than the lamination preparation time (NO), processing proceeds to step S5006. In this case, as in the first embodiment and the like, when the preparation of the laminator 112 is performed before the image forming processing, the preparation of the laminator 112 is completed before the sheet on which the image is formed is output. Therefore, the laminator 112 needs to stand by to output the sheet while maintaining the temperature raising state of the heater 2101, and thus unnecessary power is consumed. Therefore, in step S5006 and subsequent steps in the fifth embodiment, the image forming processing is executed first.

In step S5006, the lamination processing control unit 322 calculates a time to start preparation of the laminator 112. In the present embodiment, the lamination processing control unit 322 can calculate the time to start preparation for lamination from a difference between the lamination preparation time and the image forming processing time. For example, in a case where the predicted lamination preparation time is TL seconds and the predicted image forming processing time is TP seconds, the time to start preparation for lamination is calculated to be TP−TL seconds after the start of the image forming processing. That is, when the preparation for lamination is started after TP−TL seconds from the start of the image forming processing, a sheet on which an image is formed can be output at the timing when the preparation of the laminator 112 is completed, and the first copy out time can be shortened.

Thereafter, in step S5007, the image forming processing control unit 312 executes image forming processing. The processing of step S5007 is similar to the processing of step S1007 in FIG. 6.

Next, in step S5008, processing branches depending on whether or not it is time to start preparation of the laminator 112. In a case where it is not the start time (NO), processing returns to step S5008, and processing is repeated until it is time to start preparation of the laminator 112. In a case where it is time to start preparation of the laminator 112 (YES), processing proceeds to step S5009.

In step S5009, the lamination processing control unit 322 starts preparation of the laminator 112. The processing of step S5009 is similar to the processing of step S1005 in FIG. 6.

Then, after the preparation of the laminator 112 is completed, in step S5010, the lamination processing control unit 322 performs lamination processing on the sheet output from the image forming apparatus body 111. Here, the timing at which the preparation of the laminator 112 is completed is the same as the timing at which the image forming processing is completed. That is, the lamination processing can be performed without unnecessary power consumption or extension of the first copy out time.

Then, the image forming apparatus 110 ends the process.

The processing illustrated in FIG. 12 allows the image forming apparatus 110 to match the timing at which the image forming processing is completed with the timing at which the preparation of the laminator 112 is completed. In particular, in the fifth embodiment, the image forming processing time and the lamination preparation time are compared to determine which of the image forming processing and the lamination preparation is performed first, whereby each processing can be executed at an appropriate timing. Therefore, it is possible to shorten the first copy out time while suppressing unnecessary power consumption.

Figure 13:
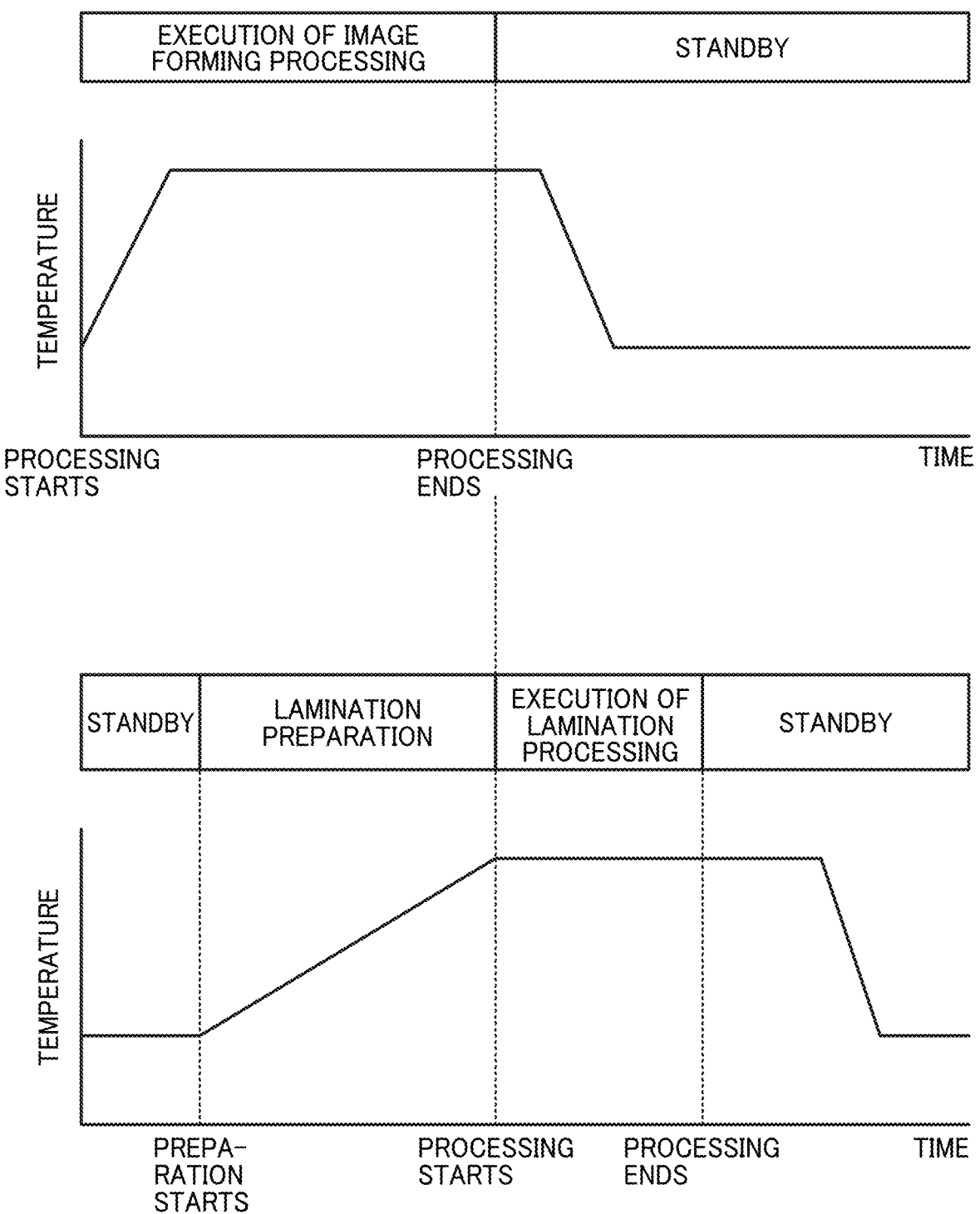
FIG. 13 is a diagram illustrating an example of a timing chart according to the fifth embodiment.

FIG. 13 is a diagram illustrating an example of a timing chart according to the fifth embodiment. The timing chart illustrated in FIG. 13 illustrates an example in which the image forming processing time is longer than the lamination preparation time. The timing chart in a case where the image forming processing time is shorter than the lamination preparation time is similar to that of the first embodiment illustrated in FIG. 7.

The upper diagram of FIG. 13 illustrates an example of temporal transition of the temperature of the heater 2051 of the image forming apparatus body 111, and the lower diagram of FIG. 13 illustrates an example of temporal transition of the temperature of the heater 2101 of the laminator 112.

As illustrated in FIG. 13, when it is determined that the image forming processing time is longer than the lamination preparation time (NO in step S5004 in FIG. 12), the image forming apparatus body 111 starts the image forming processing. At this time, the laminator 112 is in a standby state. Thereafter, when it is time to start preparation of the laminator 112 (YES in step S5008 in FIG. 12), the laminator 112 starts preparation for the lamination processing. During this period, the execution of the image forming processing is continued.

Then, preparation of the laminator 112 is also completed at the timing when the image forming processing is completed. Therefore, the sheet on which the image is formed can be subjected to lamination processing without standby. Note that after completion of the image forming processing, the image forming apparatus body 111 shifts to a mode of standby for a print job, and when a predetermined time elapses, the temperature of the heater 2051 is lowered, so that power consumption can be reduced. Further, after completion of the lamination processing, the laminator 112 also shifts to the standby mode, and when a predetermined time elapses, the temperature of the heater 2101 is lowered, so that power consumption can be reduced.

Note that each of the first to fifth embodiments described so far can be implemented in combination as long as there is no contradiction in the configuration. Therefore, for example, the second embodiment and the third embodiment may be combined such that the image forming apparatus 110 measures a plurality of times the temperature and corrects the predicted image forming processing time or lamination preparation time.

Further, the user can arbitrarily set whether or not the image forming apparatus 110 executes the control according to each embodiment described so far. For example, by applying the control of the first to fifth embodiments, it is possible to reduce power consumption and shorten the first copy out time. On the other hand, for example, in a case where some kind of trouble occurs on the laminator 112 side after the image forming processing is started and the lamination preparation cannot be completed, the sheet cannot be fed to the laminator 112 even when there is no problem with the sheet on which the image is formed, and a sheet-paper jam occurs. Therefore, in a case where the user determines to avoid such a disadvantage, it is possible to set not to perform the control according to each embodiment.

Figure 14:
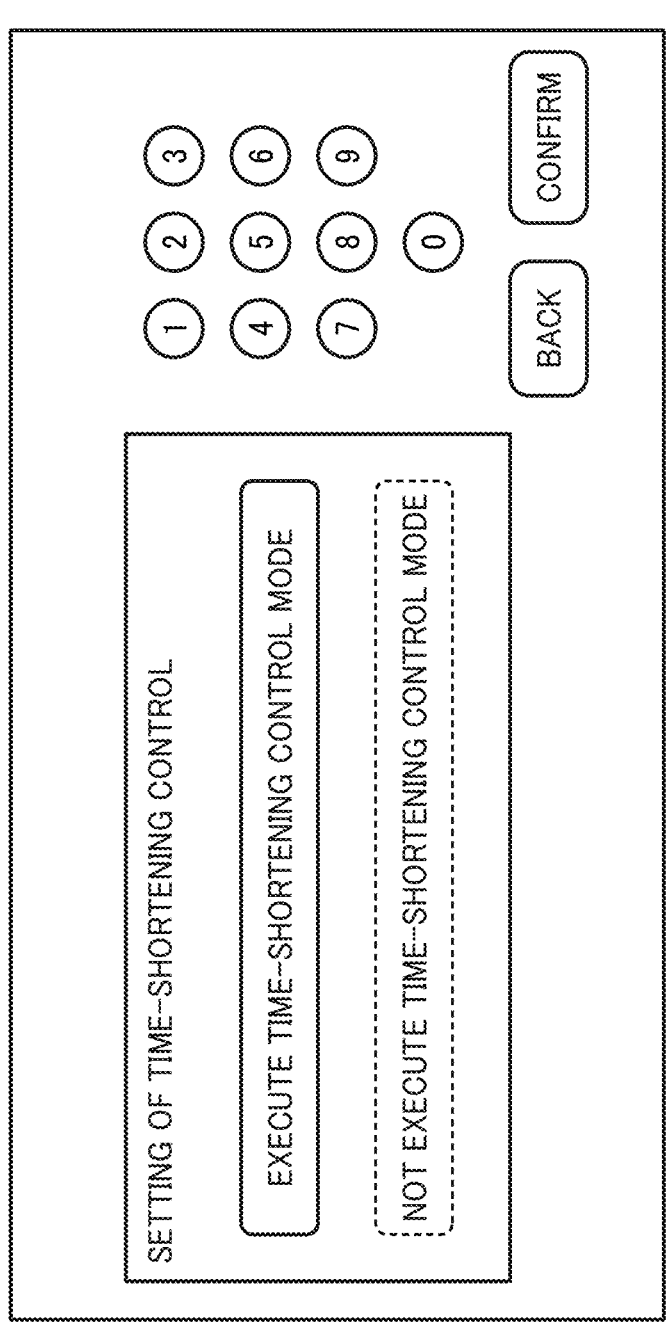
FIG. 14 is a diagram illustrating an example of a setting screen according to each embodiment.

FIG. 14 is a diagram illustrating an example of a setting screen according to each embodiment. The screen illustrated in FIG. 14 is displayed on the display 208 by the display unit 318. Here, the control according to any one of the first to fifth embodiments is referred to as "time-shortening control". In a case where the time-shortening control is performed, the user selects "execute the time-shortening control mode", and in a case where the time-shortening control is not performed, the user selects "not execute the time-shortening control mode". The image forming apparatus 110 stores the selected setting, and selects, when executing the print job, whether or not to perform time-shortening control, that is, control to match the timing at which the image forming processing is completed with the timing at which the preparation of the laminator 112 is completed. As a result, the control desired by the user can be appropriately executed.

In each of the embodiments described so far, an example has been described in which the lamination processing is performed as a processing process after the image forming process, and the embodiment is not particularly limited. Therefore, the first to fifth embodiments can be applied to, for example, a processing involving temperature raising of a heater in preparation of the processing process in addition to the lamination processing.

Examples of processing processes other than the lamination processing is the case binding processing of printed matters. The case binding processing is processing of gluing ends of a plurality of printed matters to a cover and binding the printed matters as a booklet. Therefore, in the preparation of the case binding processing, an operation of raising the temperature by the heater is involved in order to bring a solid paste into a state where the solid paste can be adhered. By predicting the time required for preparation including temperature raising of the heater and the time until completion of printing of a plurality of pages bound as a booklet and performing control to match the timings, it is possible to shorten the first copy out time while suppressing unnecessary power consumption.

According to the above-described embodiments of the present disclosure, it is possible to provide an image forming apparatus that suppresses an increase in cost and improves the first copy out time.

Each of the functions of the embodiments of the present disclosure described above can be realized by a device-executable program described in C, C++, C#, Java (registered trademark), or the like, and the program in each embodiment can be stored and distributed in a device-readable recording medium such as a hard disk device, a compact disc read-only memory (CD-ROM), a magnetic optical (MO), a digital versatile disc (DVD), a flexible disk, an electrically erasable programmable read-only memory (EEPROM) (registered trademark), or an erasable programmable read-only memory (EPROM), or can be transmitted via a network in a format that can be used by other devices.

Each of the functions of the described embodiments may be implemented by one or more processing circuits or circuitry. Here, the "processing circuit or circuitry" in the present description includes a processor programmed to execute each function by software like a processor implemented by an electronic circuit, and a device such as an application specific integrated circuit (ASIC), a digital signal processor (DSP), a field programmable gate array (FPGA), or a conventional circuit module designed to execute each function described above.

Although several embodiments of the present disclosure have been described above, embodiments of the present disclosure are not limited thereto, and various modifications may be made without departing from the spirit and scope of the present disclosure that can be estimated by skilled person. Such modifications exhibiting functions and effects of the present disclosure are within the scope of the present disclosure.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The invention claimed is:

1. An image forming apparatus, comprising:
a first heater configured to be used in an image forming process;
a second heater configured to be used in a processing process after the image forming process; and
processing circuitry configured to:
measure a first measured temperature of the first heater;
measure a second measured temperature of the second heater;
predict, based on the first measured temperature, a first time at which the image forming process ends;
predict, based on the second measured temperature, a second time until the second heater is ready for starting the processing process; and
control, based on the first time and the second time, a start of the image forming process such that the image forming process ends at a point of time at which the second time elapses.

2. The image forming apparatus according to claim 1, wherein the processing circuitry is configured to:
control operation of the second heater; and
control the second heater to have a set temperature at a point of time at which the image forming process ends, in response to the second time being shorter than the first time.

3. The image forming apparatus according to claim 1, wherein the processing circuitry is configured to:
measure a temperature inside a device configured to perform the image forming process; and
predict the first time based on the temperature measured inside the device.

4. The image forming apparatus according to claim 1, wherein the processing circuitry is configured to:
measure a temperature outside a device configured to perform the image forming process; and
predict the first time based on the temperature measured outside the device.

5. The image forming apparatus according to claim 1, wherein the processing circuitry is configured to:
measure a temperature inside a device configured to perform the processing process; and
predict the second time based on the temperature measured inside the device.

6. The image forming apparatus according to claim 1, wherein the processing circuitry is configured to:
measure a temperature inside a device configured to perform the processing process; and
predict the second time based on the temperature measured inside the device.

7. The image forming apparatus according to claim 1, wherein the processing circuitry is configured to:
measure a voltage supplied to a device configured to perform the image forming process;
calculate a power available by the device; and
predict the first time based on the voltage measured and the power calculated.

8. The image forming apparatus according to claim 1, wherein the processing circuitry is configured to:
measure a voltage supplied to a device configured to perform the processing process;
calculate a power available by the device; and
predict the second time based on the voltage measured and the power calculated.

9. The image forming apparatus according to claim 1, wherein the processing circuitry is configured to:
measure the temperature of the second heater a plurality of times; and
predict the second time based on a plurality of second measured temperatures of the second heater.

10. The image forming apparatus according to claim 1, wherein the processing circuitry is configured to:
measure the temperature of the second heater a plurality of times;
predict the second time each time the temperature of the second heater is measured; and
control the start of the image forming process in response to the second time predicted being shorter than the first time.

11. The image forming apparatus according to claim 1, wherein the processing process is lamination processing.

12. The image forming apparatus according to claim 1, further comprising a display configured to display a screen for selecting whether to execute a mode in which the processing circuitry controls the start of the image forming process based on the first measured temperature and the second measured temperature.

13. The image forming apparatus according to claim 1, wherein the processing circuitry is configured to:
control, the start of the image forming process based on a difference between the first time and the second time.

14. An image forming method, comprising:
first measuring a temperature of a first heater configured to be used in an image forming process;
second measuring a temperature of a second heater configured to be used in a processing process after the image forming process;
predicting, based on the first measured temperature, a first time at which the image forming process ends;
predicting, based on the second measured temperature, a second time until the second heater is ready for starting the processing process; and
controlling, based on the first time and the second time, a start of the image forming process such that the image forming process ends at a point of time at which the second time elapses.

15. A non-transitory recording medium storing computer-readable instructions which, when executed by one or more processors, cause the one or more processors to execute a process, the process comprising:

first measuring a temperature of a first heater configured to be used in an image forming process;

second measuring a temperature of a second heater configured to be used in a processing process after the image forming process;

predicting, based on the first measured temperature, a first time at which the image forming process ends;

predicting, based on the second measured temperature, a second time until the second heater is ready for starting the processing process; and controlling, based on the first time and the second time, a start of the image forming process such that the image forming process ends at a point of time at which the second time elapses.

*   *   *   *   *